(12) United States Patent
Daiku (10) Patent No.: US 12,517,372 B2
(45) Date of Patent: Jan. 6, 2026

(54) AERIAL DISPLAY APPARATUS (71) Applicant: TOPPAN Holdings Inc., Tokyo (JP)

(72) Inventor: Yasuhiro Daiku, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 498 days.

(21) Appl. No.: 18/060,280

(22) Filed: Nov. 30, 2022

(65) Prior Publication Data

US 2023/0092598 A1 Mar. 23, 2023

Related U.S. Application Data (63) Continuation of application No. PCT/JP2021/020209, filed on May 27, 2021.

(30) Foreign Application Priority Data

Jun. 3, 2020 (JP) ................................. 2020-096737

(51) Int. Cl.
G02B 30/56 (2020.01)
(52) U.S. Cl.
CPC .................... G02B 30/56 (2020.01)
(58) Field of Classification Search
CPC .... G02B 30/56; G02B 27/0018; G02B 30/60; G02B 5/00; G03B 21/62
See application file for complete search history.

(56) References Cited

U.S. PATENT DOCUMENTS

2009/0310231 A1 12/2009 Maekawa

FOREIGN PATENT DOCUMENTS

| JP | 2007-328309 A | | 12/2007 |
|---|---|---|---|
| JP | 2008-158114 | | 7/2008 |
| JP | 2013-257529 | | 12/2013 |
| JP | 2013257529 A | * | 12/2013 |
| JP | 2017-67933 A | | 4/2017 |
| JP | 2017-167224 A | | 9/2017 |
| JP | 2019-32404 A | | 2/2019 |
| JP | 2019-105744 A | | 6/2019 |

(Continued)

OTHER PUBLICATIONS

International Search Report (Form PCT/ISA/210); mailed Aug. 17, 2021 in corresponding PCT Application No. PCT/JP2021/020209 (3 pages) (2 pages English Translation).

(Continued)

Primary Examiner — Cara E Rakowski
Assistant Examiner — Ruby L Kauffman
(74) Attorney, Agent, or Firm — Studebaker Brackett PLLC (57) ABSTRACT An aerial display apparatus that ensures a display quality of an aerial image is provided. An aerial display apparatus according to an embodiment includes: a display unit (20) including a display surface on which an image is displayed and configured to emit display light from the display surface; and a mirror device disposed obliquely with respect to the display surface of the display unit (20), and configured to reflect the display light emitted by the display unit (20) to allow an aerial image to be formed at a position that is plane-symmetrical to the display unit (20), a light distribution of the display light being greater than −35.0 degrees and less than +35.0, given that a normal direction of the display surface is 0 degrees.

13 Claims, 13 Drawing Sheets (56) References Cited

FOREIGN PATENT DOCUMENTS

WO     WO-2019225572 A1 * 11/2019
WO     WO 2019/240137 A1    12/2019

OTHER PUBLICATIONS

Written Opinion (Form PCT/ISA/237) mailed Aug. 17, 2021 in corresponding PCT Application No. PCT/JP2021/020209 (4 pages).
Written Opinion (Form PCT/ISA/237); mailed Aug. 17, 2021 in corresponding PCT Application No. PCT/JP2021/020209 (4 pages) (3 pages English Translation).
International Preliminary Report on Patentability (Form PCT/IB/373); mailed Dec. 6, 2022 in corresponding PCT Application No. PCT/JP2021/020209 (1 page).
Notification of Transmittal of Translation of the International Preliminary Report on Patentability (Form PCT/IB/338); mailed Dec. 15, 2022 in corresponding PCT Application No. PCT/JP2021/020209 (1 page).
Extended European Search Report issued in counterpart of European Application No. 21817116.3 dated Nov. 20, 2023.

* cited by examiner

Image formation position (D1)

FIG. 14

Observation position (retinal projection approximation) (D2)

| Surface | Radius of curvature (mm) | Planar interval (mm) | Material name |
|---|---|---|---|
| Light source 22 | – | | – |
| | | 0.7 | |
| First lens 23 | – | 1.2 | BK7 |
| | 14.0 | | |
| | | 36.0 | |
| Second lens 24 ※1 | – | 2.0 | ACRYLIC |
| | 18.5 | | |

※1 Second lens is a Fresnel lens.

AERIAL DISPLAY APPARATUS

CROSS REFERENCE TO RELATED APPLICATIONS

This application is a Continuation Application of PCT Application No. PCT/JP2021/020209, filed May 27, 2021 and based upon and claiming the benefit of priority from Japanese Patent Application No. 2020-096737, filed Jun. 3, 2020, the entire contents of all of which are incorporated herein by reference.

FIELD

The present invention relates to an aerial display apparatus.

BACKGROUND

An aerial display apparatus capable of displaying an image, a moving image, etc. as an aerial moving image has been studied and is expected as a new human-machine interface. The aerial display apparatus reflects light emitted from a display surface of a display device and forms a real image in the air using, for example, a dihedral corner reflector array in which dihedral corner reflectors are arranged in an array. In the display method using the dihedral corner reflector array, aberrations do not occur, and a real image (hereinafter, an "aerial image") is displayed at a plane-symmetrical position.

SUMMARY

Technical Problem

The present invention provides an aerial display apparatus that ensures a display quality level of an aerial image.

Solution to Problem

An aerial display apparatus according to an embodiment includes a display unit including a display surface on which an image is displayed and configured to emit display light from the display surface; and a mirror device disposed obliquely with respect to the display surface of the display unit, and configured to reflect the display light emitted by the display unit to allow an aerial image to be formed at a position that is plane-symmetrical to the display unit, a light distribution of the display light being greater than −35.0 degrees and less than +35.0, given that a normal direction of the display surface is 0 degrees.

Advantageous Effects of Invention

According to the present invention, it is possible to provide an aerial display apparatus that ensures a display quality of an aerial image.

DETAILED DESCRIPTION

Hereinafter, embodiments will be described with reference to the drawings. The drawings are schematic or conceptual, and the dimensions, ratios, and the like of each drawing are not necessarily the same as the actual ones. Portions that represent the same component in different drawings may be shown in different dimensional relationships and/or ratios. In particular, several embodiments described below exemplify an apparatus and a method for embodying the technical idea of the present invention, and the technical idea of the present invention is not specified by the shape, structure, disposition, or the like of the components. In the following description, elements having the same function and configuration will be denoted by the same reference numerals, and redundant descriptions will be made only if necessary.

1. FIRST EMBODIMENT

1-1. Principles of Aerial Display Apparatus

An aerial display apparatus is configured, for example, to image light emitted from a display surface of a display unit such as a liquid crystal display, using an aerial imaging device (mirror device) such as a dihedral corner reflector.

Figure 1:
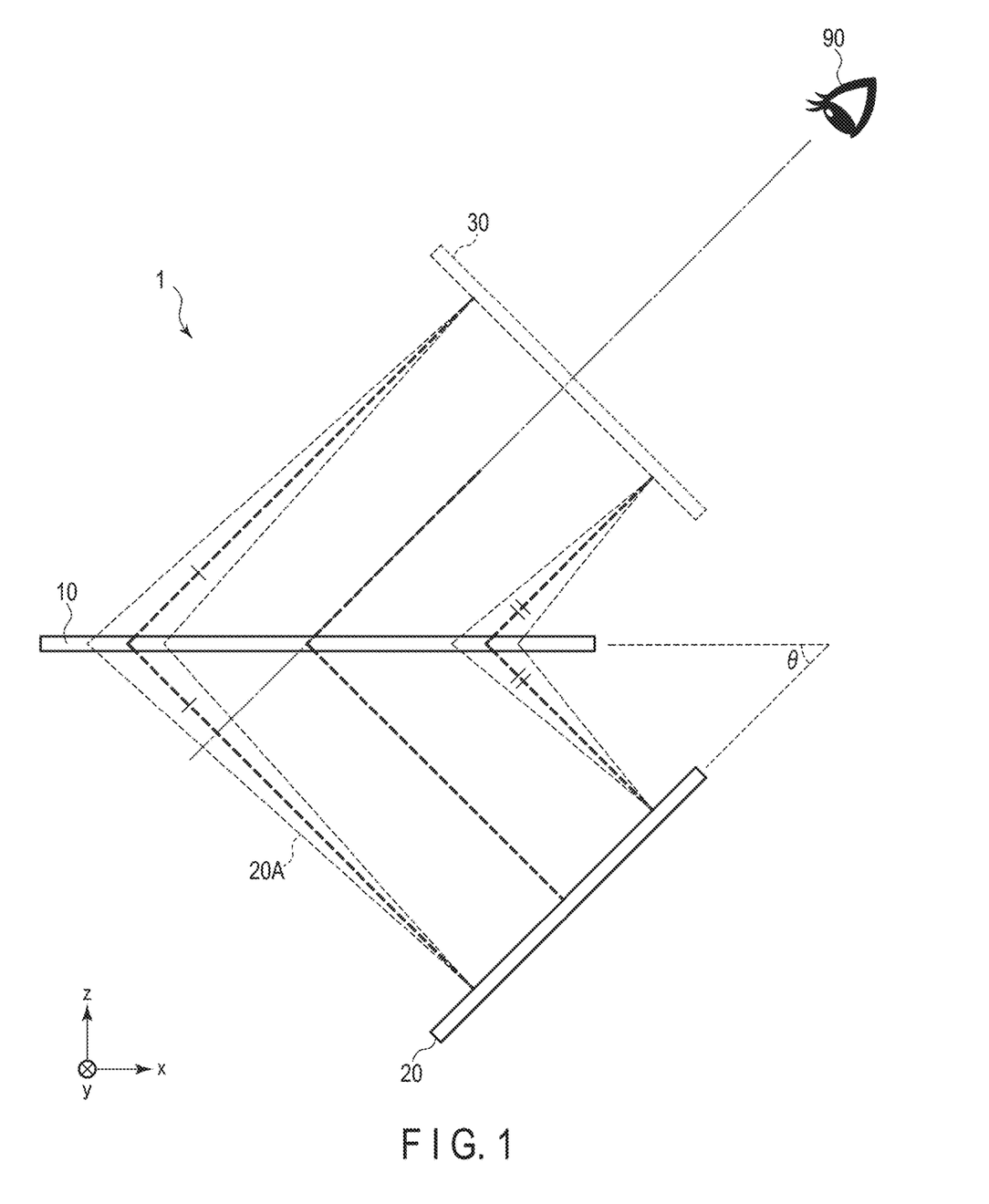
FIG. 1 is a diagram schematically showing a configuration example of an aerial display apparatus.

FIG. 1 is a diagram schematically showing a configuration example of an aerial display apparatus.

An aerial display apparatus 1 includes a display unit 20 and a mirror device 10. The aerial display apparatus 1 may include a display driver (not illustrated), voltage supply circuitry (not illustrated), and control circuitry (not illustrated), and may be driven and controlled by such configurations provided outside.

Figure 2:
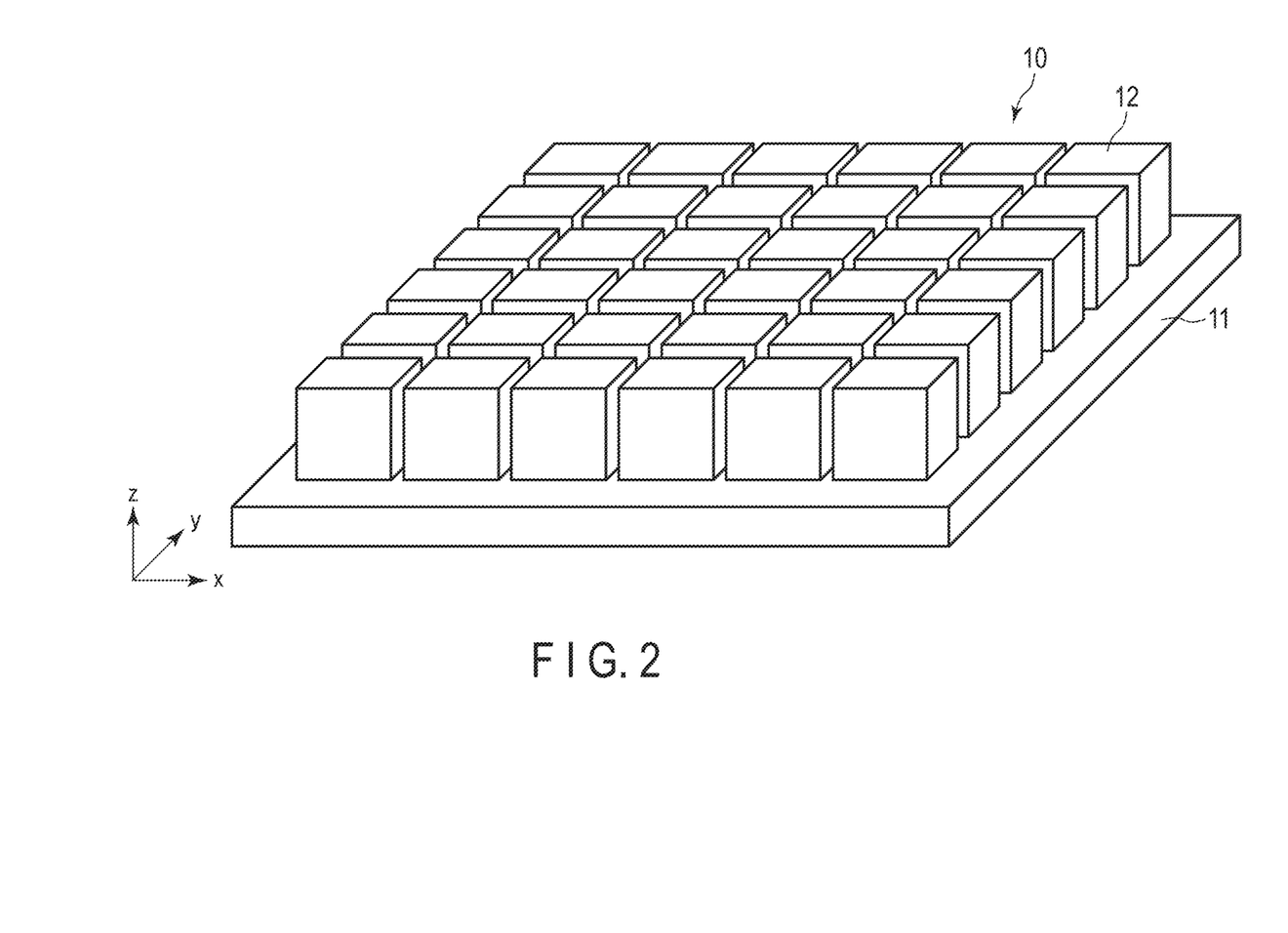
FIG. 2 is a diagram schematically showing a configuration example of a mirror device shown in FIG. 1.

A principal surface of the mirror device 10 is positioned in parallel to an x-y plane (shown in FIG. 2). A display surface of the display unit 20 is disposed, for example, to form an angle θ of, for example, 45 degrees with respect to the x-y plane. In other words, the principal surface of the mirror device 10 is disposed obliquely, for example, at 45 degrees with respect to the display surface of the display unit 20. That is, the angle θ formed by the display surface of the display unit 20 and the principal surface of the mirror device 10 is, for example, 45 degrees. The angle θ is not limited to 45 degrees, and can be set within the range of equal to or greater than 30 degrees and equal to or less than 60 degrees.

The light emitted from the display unit 20 is reflected by the mirror device 10. The light that has been reflected by the mirror device 10 is formed into a real image (aerial image) 30 in the air at a position between the mirror device 10 and the observer 90. An aerial image 30 is formed at a position that is plane-symmetrical to the display unit 20 with respect to the mirror device 10.

The display unit 20 includes a light source and a display device (not illustrated). The light emitted from the light source is controlled by an optical system in such a manner that the light distribution falls within a predetermined range, and is emitted toward the display device. The display device allows the incident light to be transmitted therethrough, and displays an image, a moving image, or the like indicating desired information. That is, the display device emits light (hereinafter, "display light") for displaying an image, a moving image, or the like as an aerial image using the light emitted from the light source. The display surface of the display unit 20 is a surface from which the display light is emitted, and is a surface on a side that faces the mirror device 10 in the aerial display apparatus 1 according to the present embodiment.

A configuration of the display unit 20 applied to the aerial display apparatus 1 will be described later.

The display driver drives a display device of the display unit 20 to display an image, a moving image, or the like on the display device.

The voltage supplying circuitry generates voltages required to operate the light source section of the display unit 20 and the display driver, and supplies the generated voltages to the light source section and the display driver.

The control circuitry controls the operation of the entire aerial display apparatus 1. That is, the control circuitry controls the light source section of the display unit 20, the display driver, and the voltage supply circuitry, and allows an aerial image 30 to be displayed at a display position between the mirror device 10 and the observer 90.

FIG. 2 is a diagram schematically showing a configuration example of the mirror device shown in FIG. 1.

FIG. 2 shows a perspective view of the mirror device 10.

The mirror device 10 includes a planar base member 11 and a plurality of optical elements 12 provided on the base member 11. The optical elements 12 are arranged, for example, in a matrix so as to extend in an x direction and a y direction that are orthogonal to each other. Each of the optical elements 12 has two reflective surfaces that are orthogonally disposed. Each optical element 12 has a cubic or rectangular parallelepiped shape. The base member 11 and the optical elements 12 are configured of a transparent resin.

In FIG. 2, 36 (=6×6) optical elements 12 are shown as an example; however, in actuality, a greater number of optical elements 12 may be arranged. The number and size of the optical elements 12 can be freely set according to the specification of the aerial display apparatus 1. An interval between two optical elements 12 can be freely set according to the specification of the aerial display apparatus.

Figure 3:
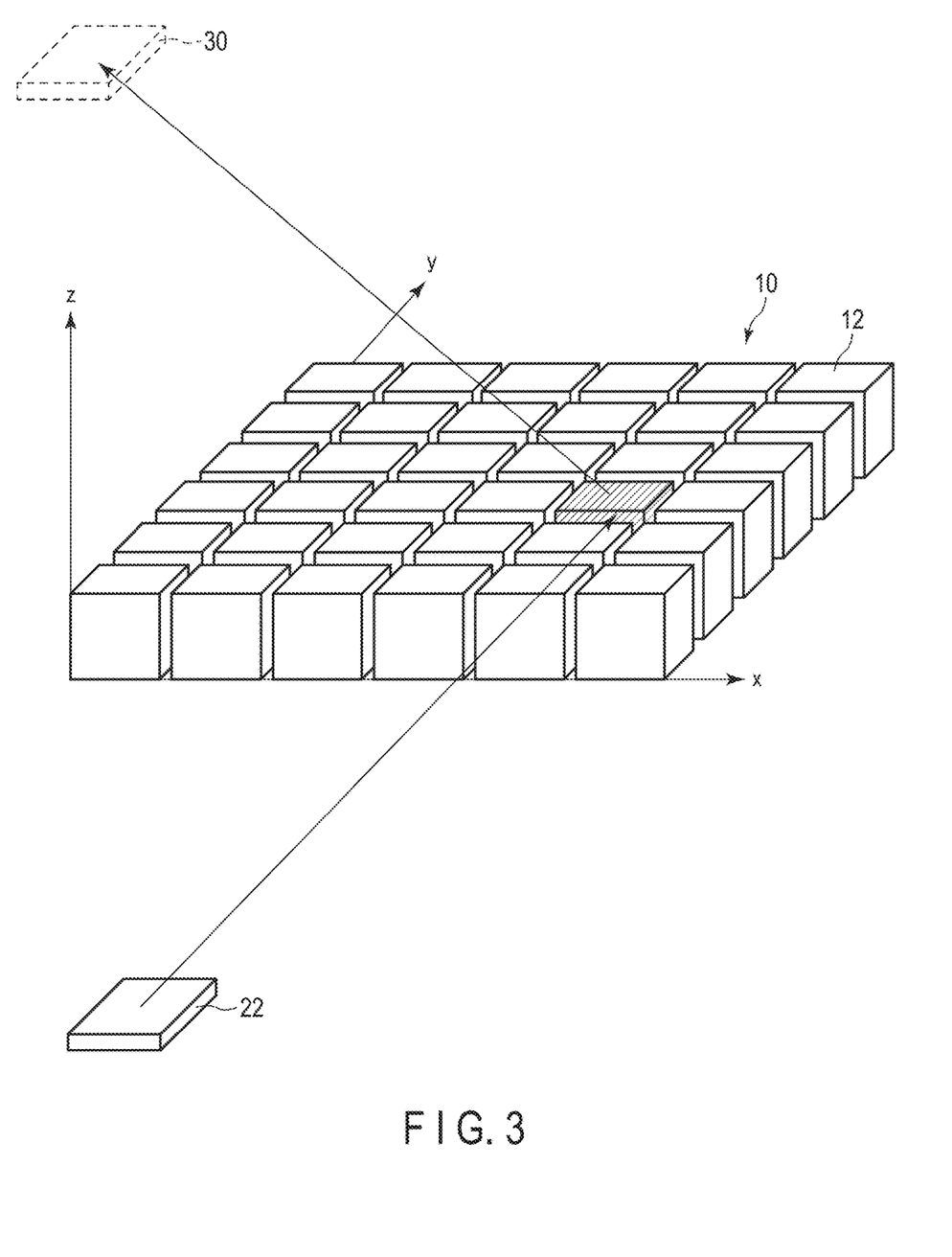
FIG. 3 is a schematic diagram illustrating principles of an aerial display apparatus 1 according to an embodiment.

FIG. 3 is a schematic diagram illustrating principles of the aerial display apparatus 1.

The aerial display apparatus 1 includes a display unit 20 that displays an image on a display surface and a mirror device 10. In FIG. 3, the base member 11 of the mirror device 10 is not illustrated, and only the optical elements 12 are extracted for illustration, for ease of understanding of the drawing. The optical elements 12 are arranged on an x-y plane. The z direction is a height direction of the optical elements 12.

Light (display light) emitted from the display device 20 is reflected by two side surfaces of each of the optical elements 12. In FIG. 3, an optical path of light reflected by the hatched optical element 12 is extracted for illustration. The light emitted from the display device 20 is imaged at a position that is plane-symmetrical to the display device 20 with respect to the mirror device 10, and an aerial image 30 is formed at that position. An observer can visually recognize the aerial image.

Figure 4:
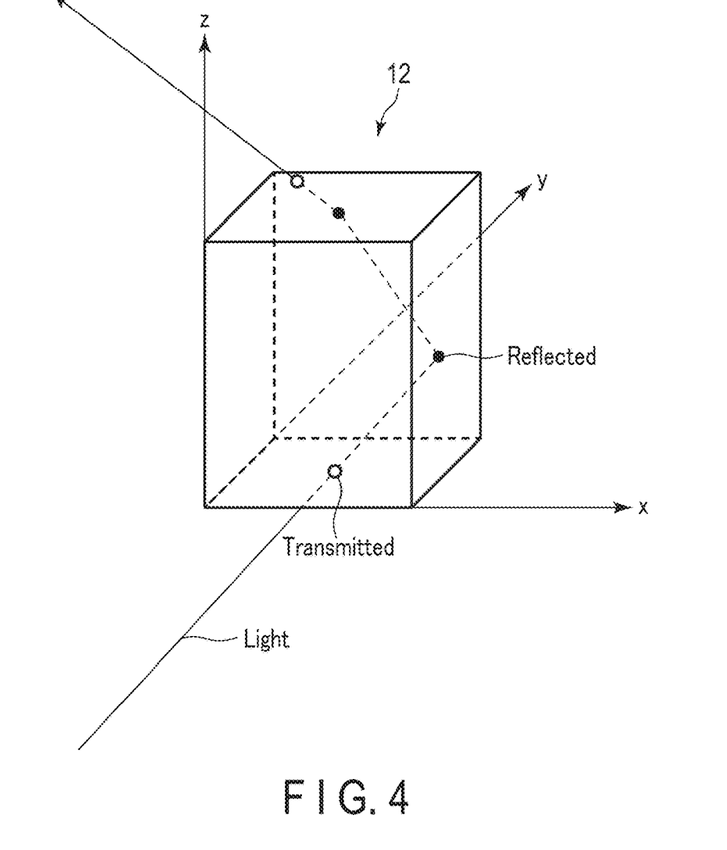
FIG. 4 is a schematic diagram illustrating an example of light being reflected twice by a single optical element of the mirror device shown in FIG. 2.

FIG. 4 is a schematic diagram illustrating an example of light being reflected twice by a single optical element of the mirror device shown in FIG. 2.

Figure 5:
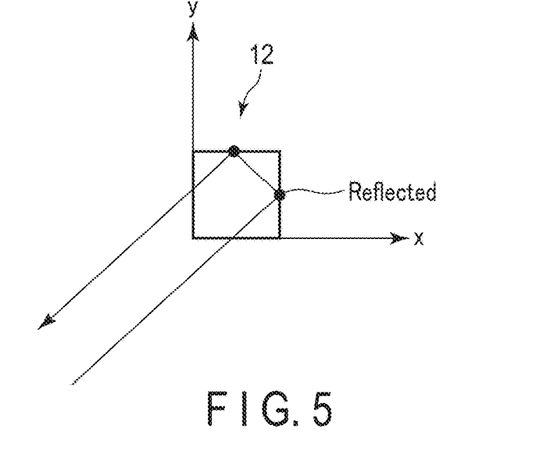
FIG. 5 is a diagram showing an optical path through the optical element shown in FIG. 4 as viewed from a z direction.

FIG. 5 is a diagram showing the optical path through the optical element shown in FIG. 4 as viewed from the z direction.

Figure 6:
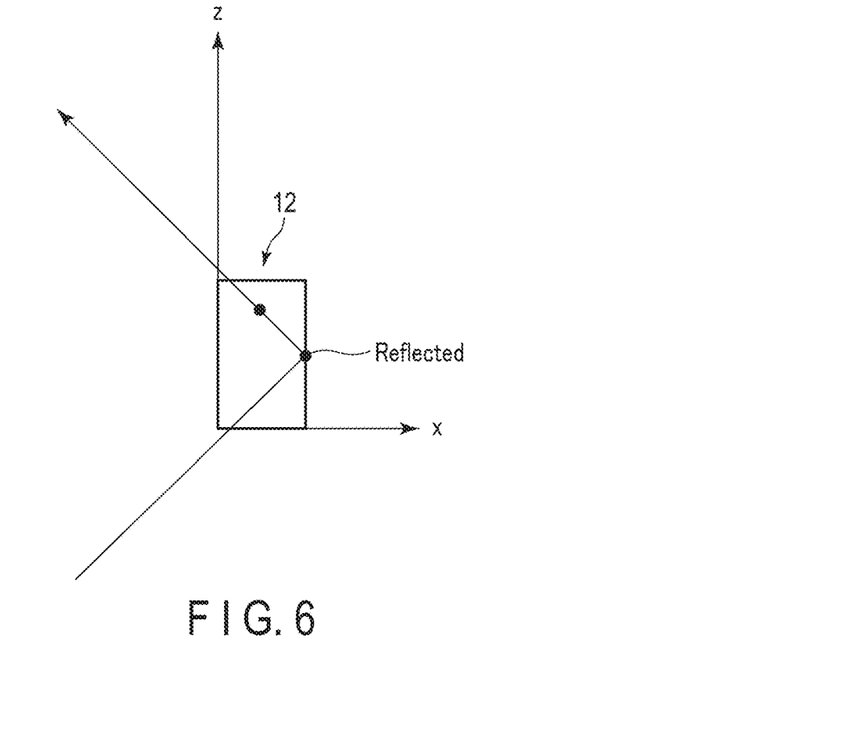
FIG. 6 is a diagram showing the optical path through the optical element shown in FIG. 4 as viewed from a y direction.

FIG. 6 is a diagram showing the optical path through the optical element shown in FIG. 4 as viewed from the y direction.

Figure 7:
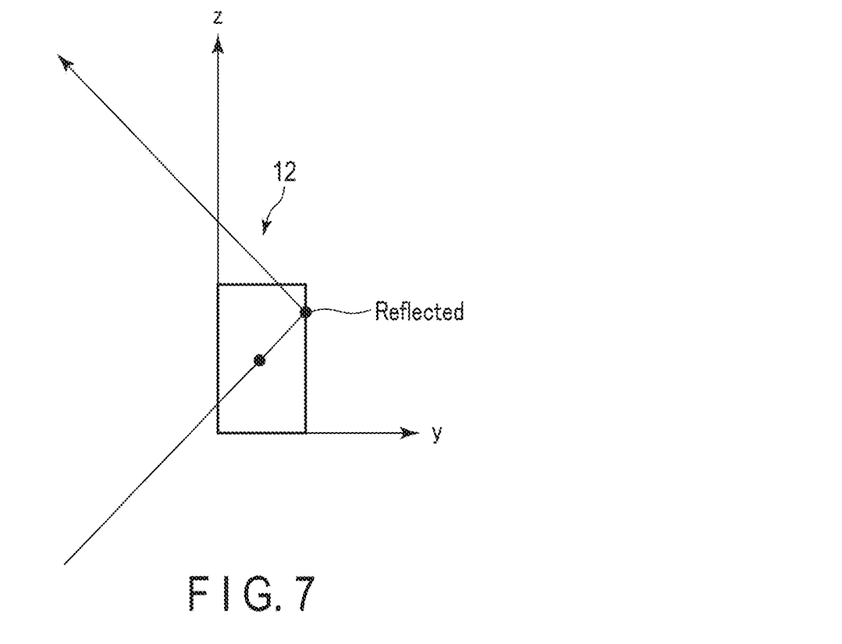
FIG. 7 is a diagram showing the optical path through the optical element shown in FIG. 4 as viewed from an x direction.

FIG. 7 is a diagram showing the optical path through the optical element shown in FIG. 4 as viewed from the x direction.

Light incident from a bottom surface of the optical element 12 is reflected by a first side surface, is further reflected by a second side surface that is perpendicular to the first side surface, and is then emitted from a top surface.

It should be noted that for light incident on a given side surface of the optical element 12, not all the components of the light are reflected by that side surface, and the light is divided into a reflective component and a transmissive component. The reflective component is a component of light reflected by the side surface at an angle of reflection corresponding to the incident angle, and the transmissive component is a component of light that is linearly transmitted through the side surface.

In the mirror device 10 as viewed from the Z direction, each optical element 12 may have a cubic or rectangular parallelepiped shape having diagonal vertexes in the x and y directions, and the optical elements 12 may be arranged in the x and y directions. In other words, each of the optical elements 12 shown in FIGS. 2-7 may be disposed at a position rotated by 45 degrees with respect to the x direction. In this case, the reflective surfaces 12A and 12B of each optical element 12 are disposed at an angle of 45 degrees with respect to the x direction. Each of the x and y directions is a direction approximately parallel to the sides of the principal surface of the base member 11 of the mirror device 10.

(Regarding Ghosts)

Next, a ghost that appears as a result of formation of an image at an unintended position by light emitted from the display device 20 and made incident on the mirror device 10 will be described. A ghost is a double image that appears in the vicinity of an aerial image 30.

Figure 8:
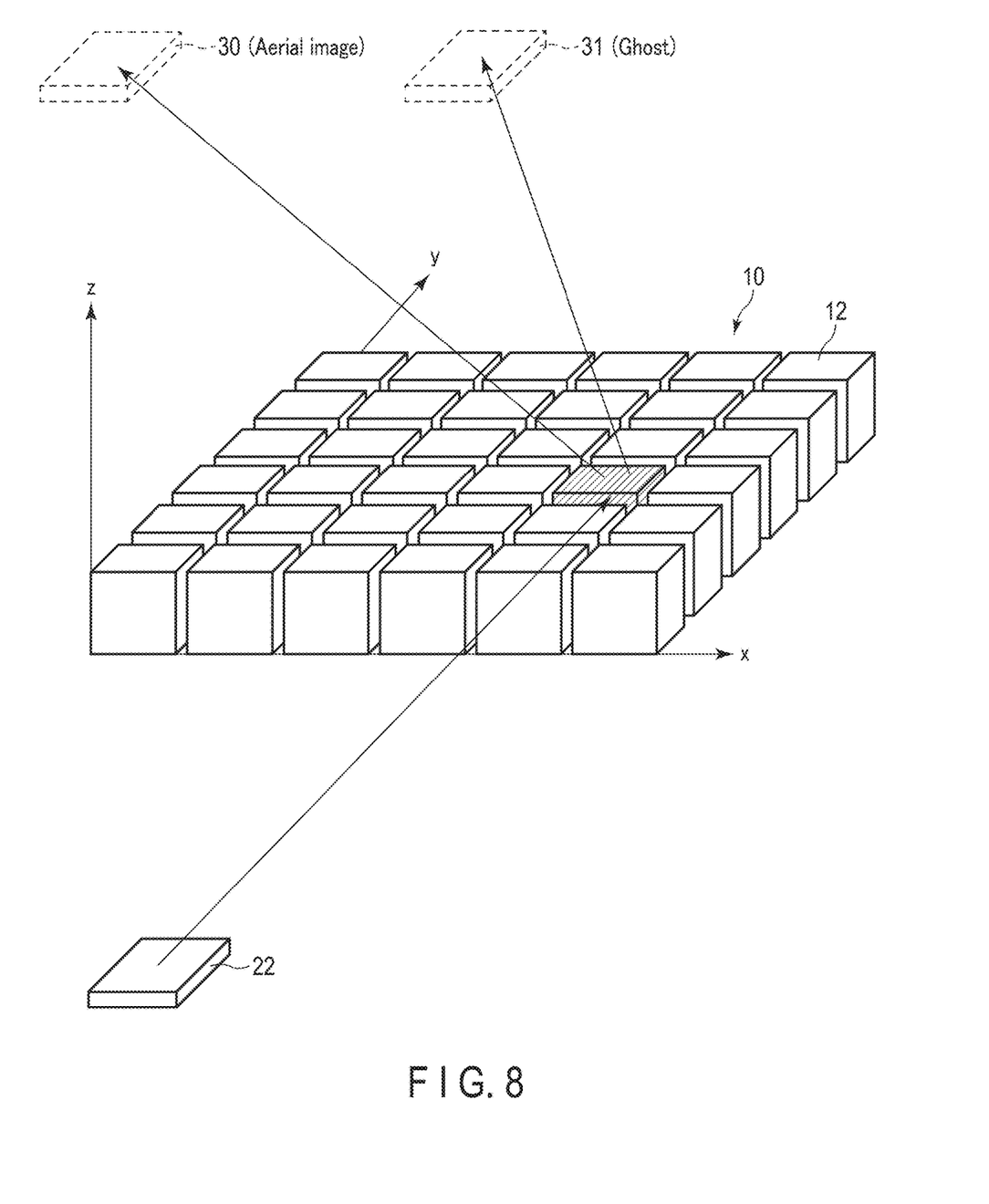
FIG. 8 is a schematic diagram illustrating a ghost displayed by the aerial display apparatus.

FIG. 8 is a schematic diagram illustrating a ghost displayed by the aerial display apparatus.

The ghost 31 is an image formed by light that is reflected only once (i.e., light that is not reflected twice) by the mirror device 10. The ghost 31 is formed at a position that is not plane-symmetrical to the display device 20 with respect to the mirror device 10.

Figure 9:
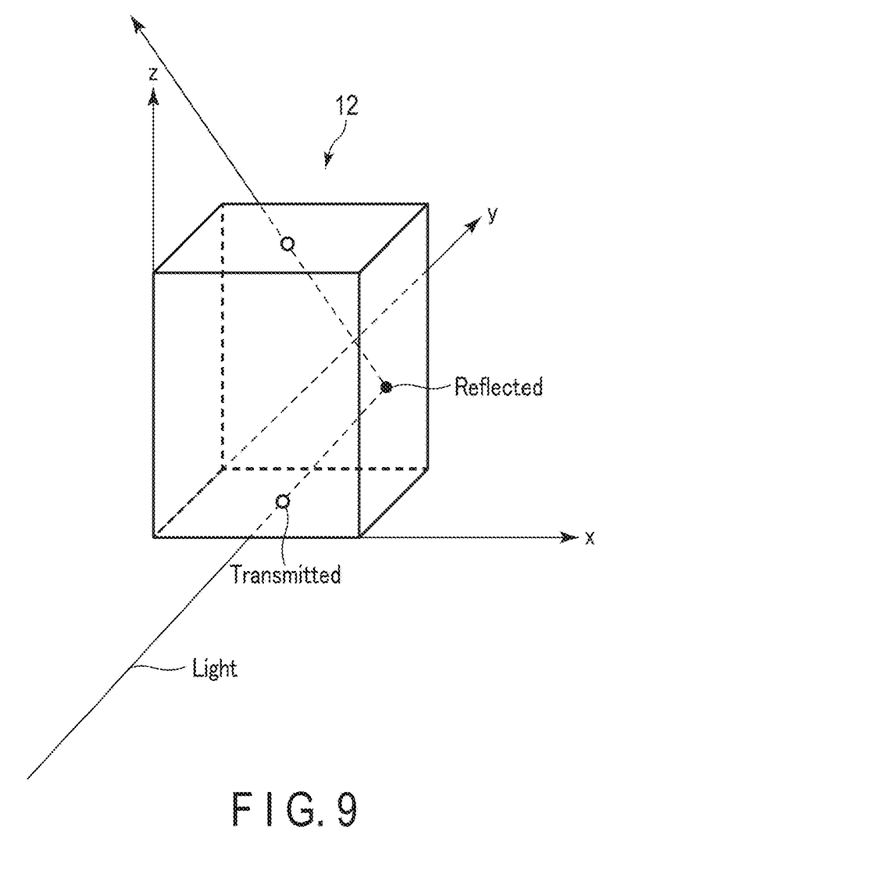
FIG. 9 is a schematic diagram illustrating light being reflected once by a single optical element of the mirror device shown in FIG. 8.

FIG. 9 is a schematic diagram illustrating light being reflected once by a single optical element of the mirror device shown in FIG. 8.

Figure 10:
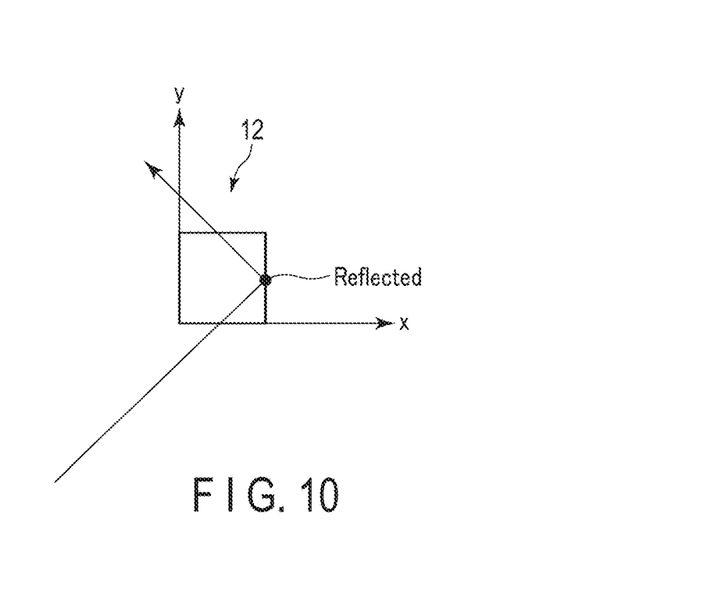
FIG. 10 is a diagram illustrating an optical path through the optical element shown in FIG. 9 as viewed from the z direction.

FIG. 10 is a diagram illustrating an optical path through the optical element shown in FIG. 9 as viewed from the z direction.

Figure 11:
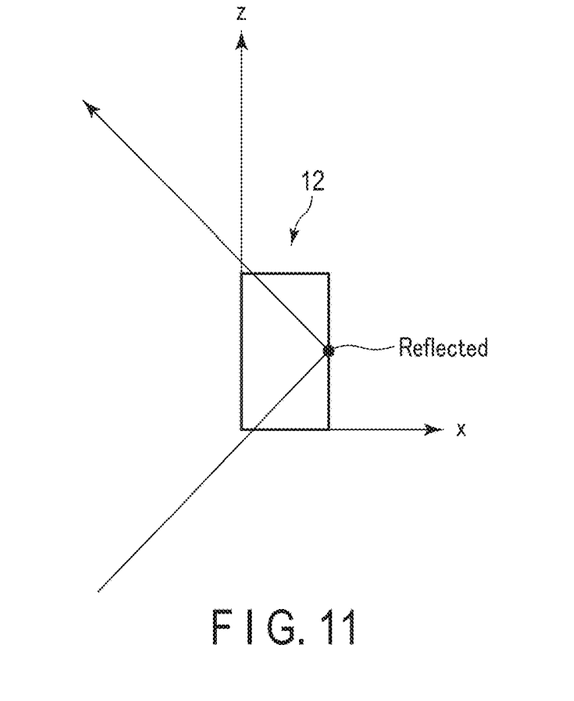
FIG. 11 is a diagram illustrating the optical path through the optical element shown in FIG. 9 as viewed from the y direction.

FIG. 11 is a diagram illustrating the optical path through the optical element shown in FIG. 9 as viewed from the y direction.

Figure 12:
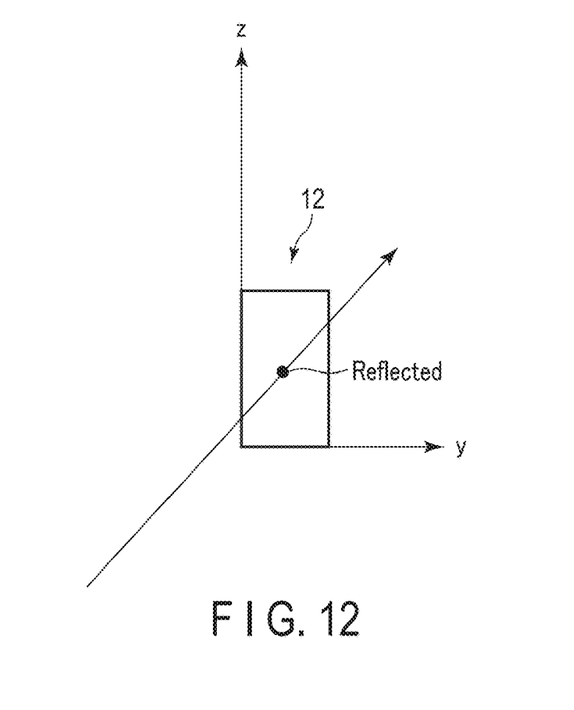
FIG. 12 is a diagram illustrating the optical path through the optical element shown in FIG. 9 as viewed from the x direction.

FIG. 12 is a diagram illustrating the optical path through the optical element shown in FIG. 9 as viewed from the x direction.

Light incident from a bottom surface of the optical element 12 is reflected by a first side surface, and is transmitted through a second side surface that is perpendicular to the first side surface. The light that travels along this path is imaged at a position that is not plane-symmetrical to the display device 20 with respect to the mirror device 10, thereby displaying a ghost 31.

Through conducting a simulation for analyzing a cause for the ghost 31 being displayed, the present inventors propose an aerial display apparatus 1 on which a ghost 31 will not be displayed.

Figure 13:
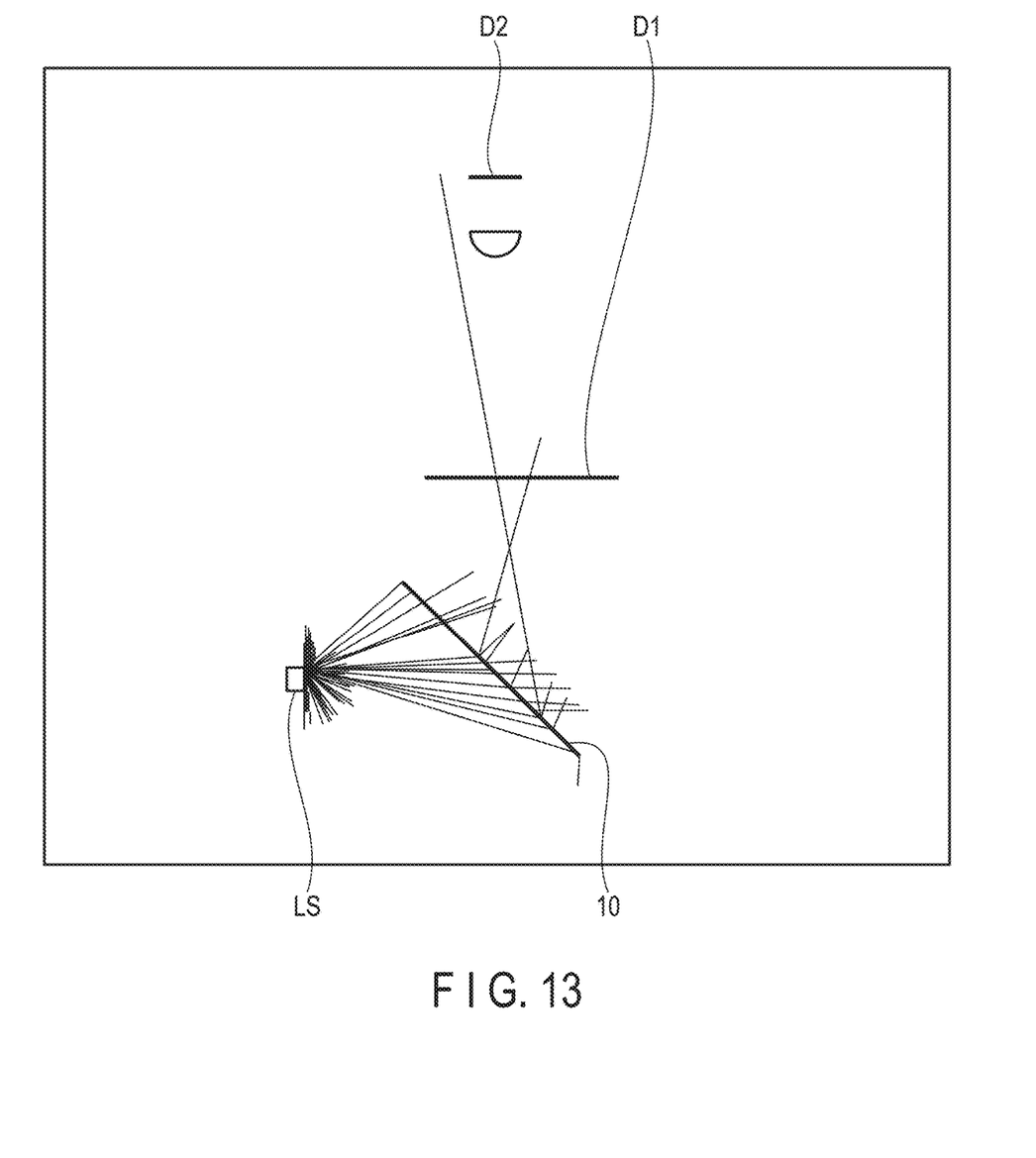
FIG. 13 is a diagram illustrating an example of a simulation condition for analyzing a cause for a ghost displayed in the aerial display apparatus.

FIG. 13 is a diagram illustrating an example of a simulation condition for analyzing a cause for a ghost being displayed in the aerial display apparatus.

In the simulation, an analysis has been conducted as to how display light reflected from the mirror device 10 is observed at an image formation position D1 and an observation position D2, using light emitted from one or more point light sources LS as the display light. The image formation position D1 is a position at which the display light reflected twice on the mirror device 10 is imaged. The observation position D2 is a position at which an observer observes an aerial image formed at the image formation position D1 by light reflected by the mirror device 10, and analyzes a simulation value obtained by a retinal projection approximation that mimics a human eye.

Figure 14:
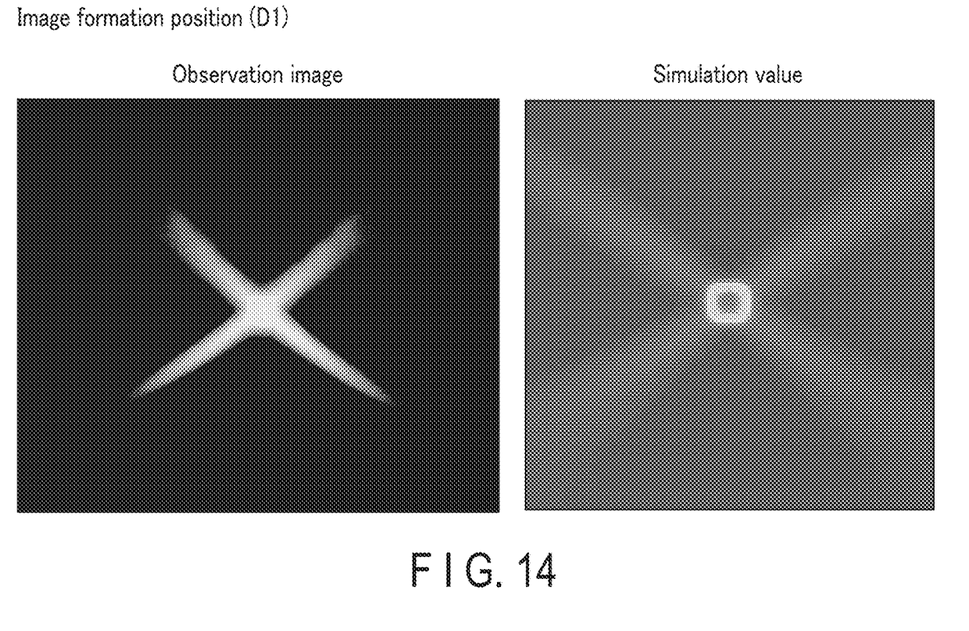
FIG. 14 is a diagram showing an example of an observation image and a simulation value at an image formation position shown in FIG. 13.

FIG. 14 is a diagram showing an example of an observation image and a simulation value at the image formation position shown in FIG. 13.

Figure 15:
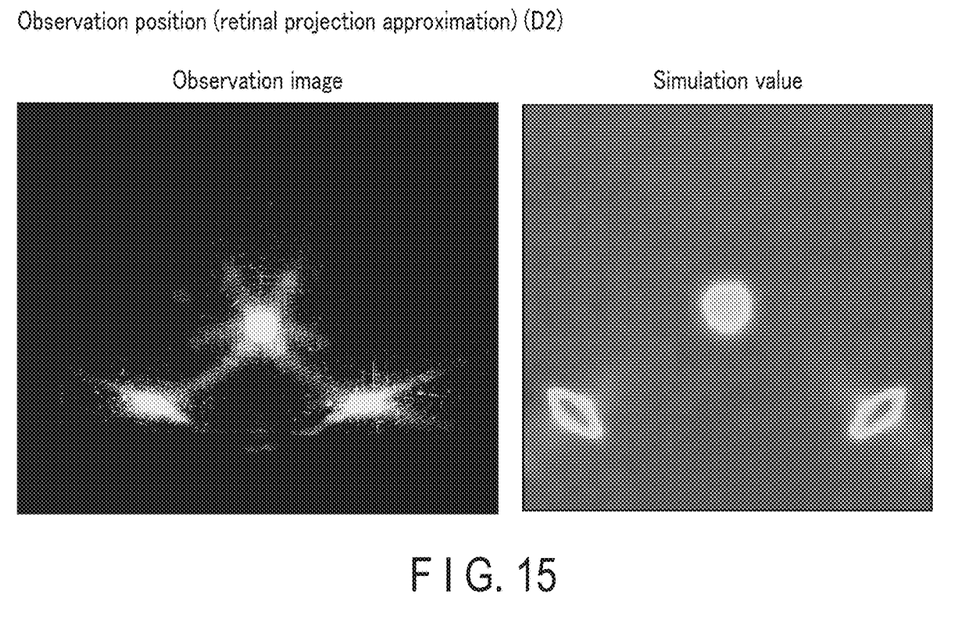
FIG. 15 is a diagram showing an example of an observation value and a simulation value in the observation shown in FIG. 13.

FIG. 15 is a diagram showing an example of an observation value and a simulation value in the observation shown in FIG. 13.

At the image formation position D1, image formation by display light by the point light source LS can be seen from both the observation image and the simulation value. At the observation position D2, an occurrence of a ghost, as well as the image formation by the display light by the point light source LS, can be seen from both the observation image and the simulation value. From these results, it can be appreciated that results corresponding to the observation images were obtained from the simulation values.

Figure 16:
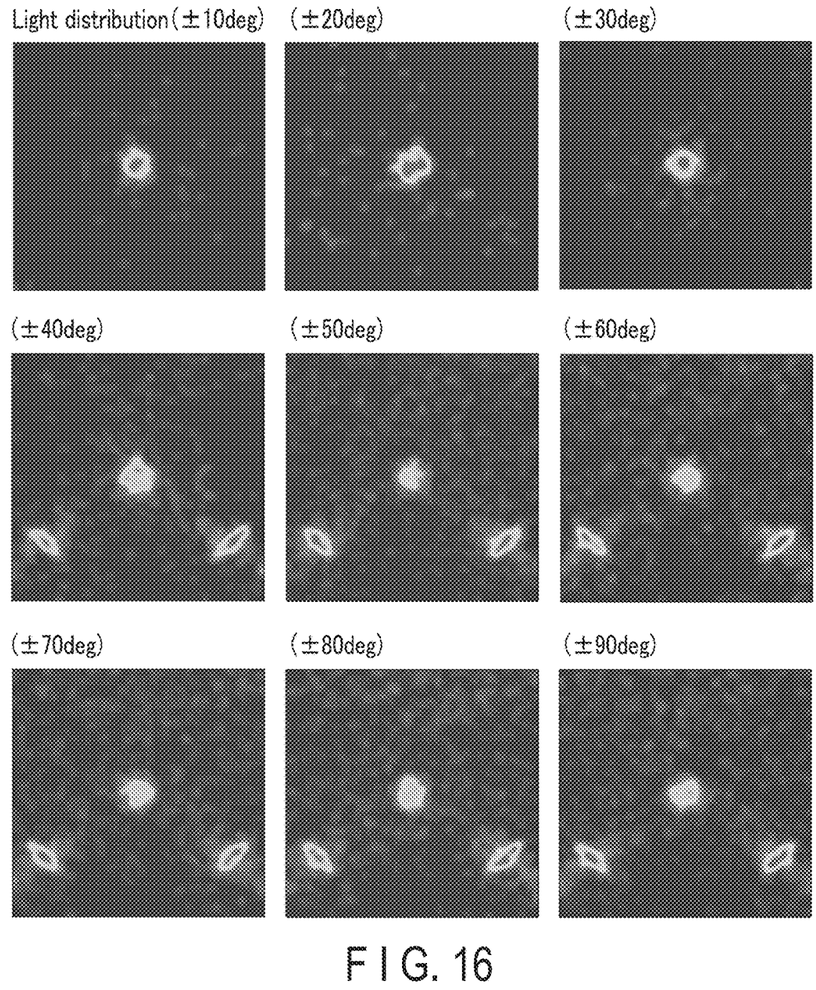
FIG. 16 is a diagram showing an example of simulation values at an observation position, with variations in light distribution of a light source.

FIG. 16 is a diagram showing an example of simulation values at an observation position, with variations in the light distribution of the light source.

In FIG. 16, simulation values at the observation position D2 are shown with respect to each of the cases where the light distribution of the light source LS fell within the ranges of ±10 degrees, ±20 degrees, ±30 degrees, ±40 degrees, ±50 degrees, ±60 degrees, ±70 degrees, ±80 degrees, and ±90 degrees. The 0-degree direction (in which the light output ratio becomes maximum) in which the light is emitted from the light source LS is a direction in which an angle θ (e.g., 45 degrees) is formed with respect to the principal surface of the mirror device 10.

Referring to the simulation results, it has been found that a ghost 31 tended to occur in the simulation result if the range of light distribution of the light source LS became wide. Also, results have been obtained in which a ghost 31 did not occur in the simulation result if the light distribution of the light source LS fell within the range of ±30 degrees, and a ghost 31 occurred in the simulation result if the light distribution of the light source LS fell within the range of ±40 degrees.

Accordingly, a simulation of display light visually recognizable at the observation position D2 was further conducted with respect to each of the cases where the light distribution of the light source LS fell within the ranges of ±30.0 degrees, ±32.5 degrees, ±35.0 degrees, ±37.5 degrees, and ±40.0 degrees.

Figure 17:
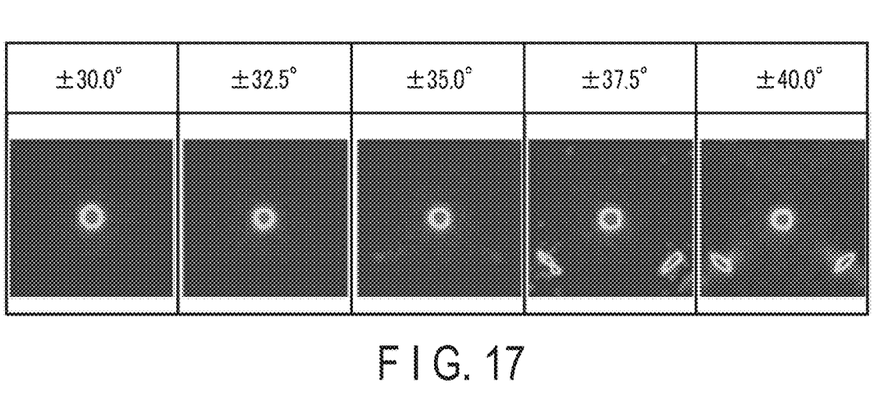
FIG. 17 is a diagram showing another example of simulation values at an observation position, with variations in the light distribution of the light source.

FIG. 17 is a diagram showing another example of simulation values at an observation position, with variations in the light distribution of the light source.

According to the simulation results, a result was obtained in which a ghost 31 started to occur in the simulation result with the light distribution of the light source LS falling within the range of ±35.0 degrees, and a ghost 31 occurred in the simulation result with the distribution of the light source LS falling within the range of ±37.5 degrees and ±40.0 degrees.

With the above simulation result, it has been found that a ghost image was formed by light from the light source LS whose light distribution exceeded the range of ±35.0 degrees with respect to the normal direction (0 degrees). Accordingly, by allowing the light distribution of the display light emitted from the display unit 20 to fall within the range of ±35.0 degrees (with the light distribution being greater than −35.0 degrees and less than +35.0 degrees), it can be considered that generation of the ghost 31 can be suppressed.

Figure 18:
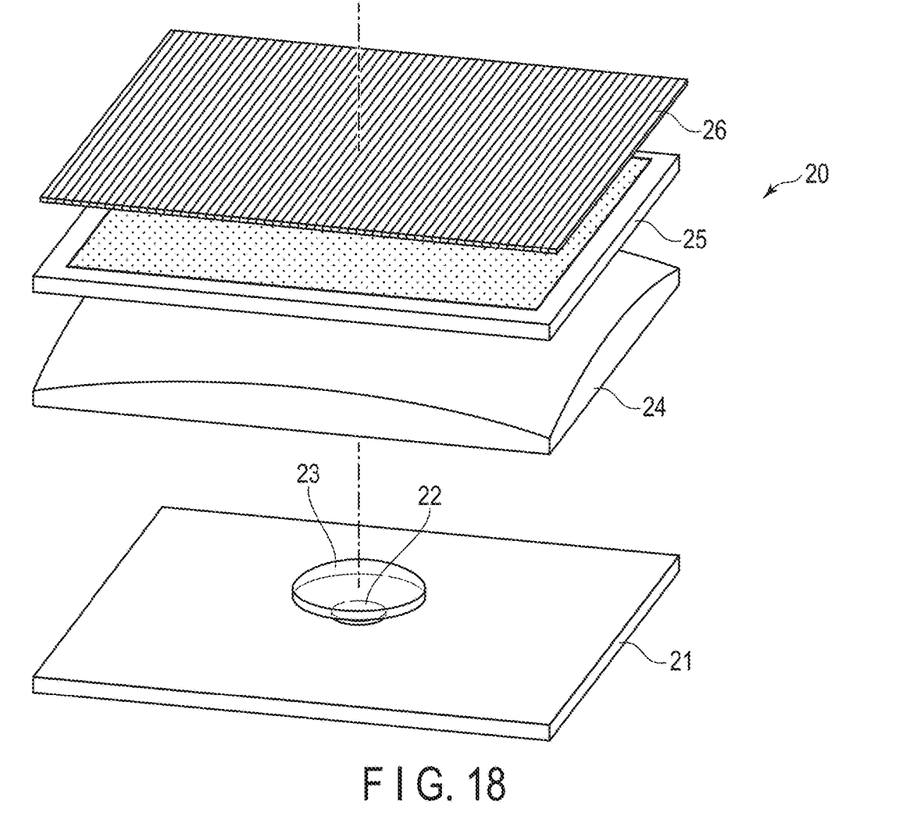
FIG. 18 is a diagram schematically showing a configuration example of a display unit of the aerial display apparatus according to the present embodiment.

FIG. 18 is a diagram schematically showing a configuration example of the display unit of the aerial display apparatus according to the present embodiment.

The display unit 20 of the aerial display apparatus 1 according to the present embodiment is configured, based on the above-described simulation results, in such a manner that the light distribution of the emitted light falls within the range of ±35.0 degrees (with the light distribution being greater than −35.0 degrees and less than +35.0 degrees) with respect to the normal direction (direction orthogonal to the display surface).

The display unit 20 includes a substrate 21, a light-emitting device 22, a first lens 23, a second lens 24, a display device 25, and a light control device 26.

The substrate 21 is a plate-shaped member that supports the light-emitting device 22 and the first lens 23.

The light-emitting device 22 is disposed above the substrate 21, and emits light in such a manner that the output ratio becomes maximum with respect to the normal direction of the principal surface of the substrate 21. The light-emitting device 22 includes, for example, one or more light-emitting diodes. The light-emitting diode emits, for example, white light.

The first lens 23 is disposed above the light-emitting device 22. The first lens 23 is, for example, a plano-convex lens formed of optical glass, and is disposed at a predetermined interval from the light-emitting device 22 in such a manner that the planar surface side of the first lens 23 faces the light-emitting device 22. It suffices that the first lens 23 is disposed at least at a position on which light emitted at least from the light-emitting device 22 is made incident, and has at least a size that can be disposed above the light-emitting device 22 and its peripheral region.

The second lens 24 is disposed above the first lens 23. The second lens 24 is, for example, a plano-convex Fresnel lens formed of a resin material, and is disposed at a predetermined interval from the first lens 23 in such a manner that the planar surface side of the second lens 24 faces the convex surface of the first lens 23. With the longer sides and the shorter sides having widths equivalent to those of the display surface of the display unit 20, the second lens 24 is greater in size than at least the first lens 23.

The display device 25 is, for example, a liquid crystal display device. Examples of the liquid crystal mode include a vertical alignment (VA) mode. The display device 25 is not limited to a VA-mode liquid crystal display device, and may be a TN-mode or homogeneous-mode liquid crystal display device.

The light control device 26 is disposed above the display device 25. The light control device 26 includes, for example, a transparent region and a translucent region. The transparent region and the translucent region of the light control device 26 extend approximately in parallel to a long-side direction or a short-side direction of the light control device 26 in a plane approximately parallel to the display surface of the display unit 20, and are disposed side by side in an alternate stripe pattern. The width in the short-side direction of the transparent region of the light control device 26 is greater than the width in the short-side direction of the translucent region.

Figure 19:
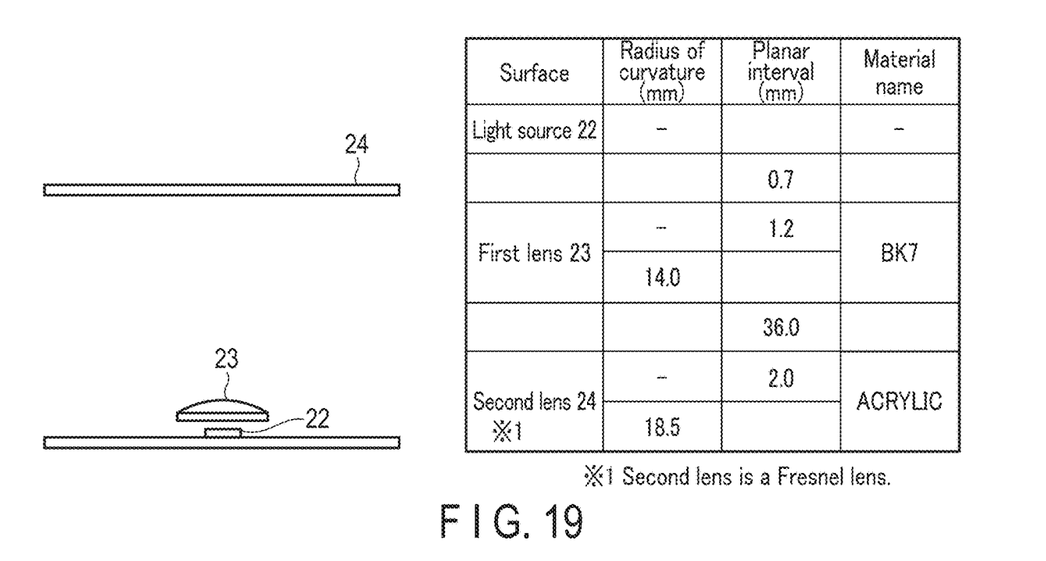
FIG. 19 is a diagram schematically showing a configuration example of the display unit of the aerial display apparatus according to the embodiment.

FIG. 19 is a diagram schematically showing a configuration example of the display unit of the aerial display apparatus according to the embodiment.

An example of a configuration of the light source 22, the first lens 23, and the second lens 24 are shown, in which the light distribution of the display light emitted from the display unit 20 falls within the range of greater than −35.0 degrees and less than +35.0 degrees, with respect to the normal direction of the display surface.

The light source 22 includes one or more light-emitting diodes, and emits light in such a manner that the output ratio becomes maximum in a normal direction of the display surface of the display unit 20.

The first lens 23 is disposed above the light source 22 at an interval of 0.7 mm. The first lens 23 is, for example, a plano-convex lens formed of BK7, which is optical glass, and is disposed in such a manner that the planar surface side faces the light source 22. The first lens 23 has a thickness (planar interval: a width of the center of the lens in an optical axis direction) of 1.2 mm, with the radius of curvature of the convex surface being 14.0 mm.

The second lens 24 is disposed above the first lens 23 at an interval of 36.0 mm. The second lens 24 is, for example, a plano-convex Fresnel lens formed of, for example, an acrylic resin, and is disposed in such a manner that the planar surface side faces the convex surface of the first lens 23. The second lens 24 has a thickness (planar interval: a width in an optical axis direction of the center of the lens) of 2.0 mm, with the radius of curvature of the convex surface being 18.5 mm.

The material and design of the light source 22, the first lens 23, and the second lens 24 are not limited to those described above, and any material and design capable of achieving a similar function can be applied.

By configuring the display unit 20 as described above, the light distribution of the display light emitted from the display unit 20 is allowed to fall within the range of ±35.0 degrees (with the light distribution being greater than −35.0 degrees and less than +35.0 degrees) with respect to the normal direction (0 degrees).

Next, an effect of an aerial display apparatus according to the present embodiment will be described.

Figure 20:
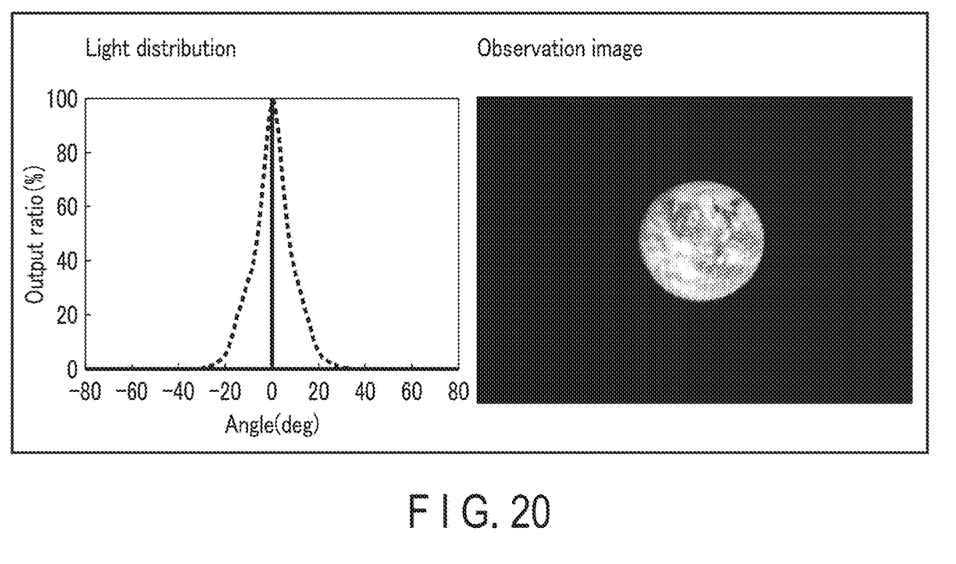
FIG. 20 is a diagram illustrating an example of an effect of the aerial display apparatus according to the embodiment.
Figure 21:
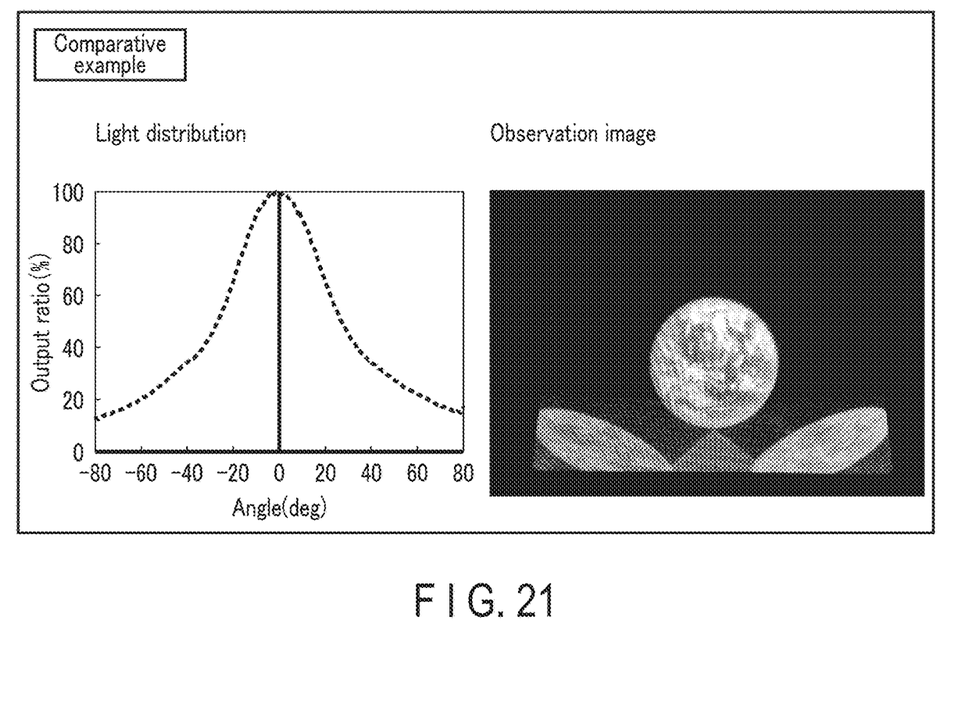
FIG. 21 is a diagram illustrating an example of an effect of the aerial display apparatus according to the embodiment.

FIGS. 20 and 21 are diagrams illustrating an example of an effect of an aerial display apparatus according to the embodiment.

In each of the drawings, an example of a light distribution of the display unit 20 and an observation image by the aerial display apparatus 1 including the display unit 20 are shown.

As is clear from FIG. 20, a ghost did not occur in the observation image with the range of the light distribution of the display unit 20 of the aerial display apparatus 1 falling within the range of greater than −35.0 degrees and less than +35.0 degrees. On the other hand, FIG. 21 shows an example of an observation image by the aerial display apparatus using a display unit with a light distribution range broader than ±80 degrees. In this example, the same image as that in FIG. 20 is displayed on the display unit, but a ghost occurred in the observation image.

As described above, with the aerial display apparatus 1 of the present embodiment in which the light distribution of the display unit 20 is allowed to fall within the range of greater than −35.0 degrees and less than +35.0 degrees, it is possible to suppress occurrence of a ghost. That is, according to the aerial display apparatus 1 of the present embodiment, it is possible to provide an aerial display apparatus that ensures a display quality of an aerial image.

The present invention is not limited to the above-described embodiments, and can be modified in various manners in practice, without departing from the gist of the invention. Moreover, the embodiments can be suitably combined; in that case, combined advantages are obtained. Furthermore, the above-described embodiments include various inventions, and various inventions can be extracted by a combination selected from structural elements disclosed herein. For example, if the problem can be solved and the effects can be attained even after some of the structural elements are deleted from all the structural elements disclosed in the embodiment, the structure made up of the resultant structural elements may be extracted as an invention.

The invention claimed is:

1. An aerial display apparatus comprising:
   a display unit including a display surface on which an image is displayed and configured to emit display light from the display surface; and
   a mirror device disposed obliquely with respect to the display surface of the display unit, and configured to reflect the display light emitted by the display unit to allow an aerial image to be formed at a position that is plane-symmetrical to the display unit,
   wherein the display unit comprises:
   a light source;
   a first lens disposed above the light source at a predetermined interval;
   a second lens disposed above the first lens at a predetermined interval;
   a display device disposed above the second lens; and
   a light control device disposed above the display device and including a plurality of transparent regions and a plurality of translucent regions, the transparent regions and the translucent regions being disposed side by side in an alternate manner,
   the first lens being a plano-convex lens with a planar surface side facing the light source,
   the second lens being a Fresnel lens with a planar surface side facing the first lens, and
   a light distribution of the display light being greater than −35.0 degrees and less than +35.0, given that a normal direction of the display surface is 0 degrees.

2. The aerial display apparatus according to claim 1, wherein the second lens is a plano-convex Fresnel lens.

3. The aerial display apparatus according to claim 1, wherein the mirror device includes a plurality of optical elements each including two reflective surfaces that are orthogonally disposed.

4. The aerial display apparatus according to claim 2, wherein the mirror device includes a plurality of optical elements each including two reflective surfaces that are orthogonally disposed.

5. The aerial display apparatus according to claim 3, wherein each of the optical elements has a cubic or rectangular parallelepiped shape.

6. The aerial display apparatus according to claim 4, wherein each of the optical elements has a cubic or rectangular parallelepiped shape.

7. The aerial display apparatus according to claim 1, wherein an angle formed by a principal surface of the mirror device and the display surface of the display unit is 45 degrees.

8. The aerial display apparatus according to claim 2, wherein an angle formed by a principal surface of the mirror device and the display surface of the display unit is 45 degrees.

9. The aerial display apparatus according to claim 3, wherein an angle formed by a principal surface of the mirror device and the display surface of the display unit is 45 degrees.

10. The aerial display apparatus according to claim 1, wherein an angle formed by a principal surface of the mirror device and the display surface of the display unit is 45 degrees.

11. The aerial display apparatus according to claim 2, wherein an angle formed by a principal surface of the mirror device and the display surface of the display unit is 45 degrees.

12. The aerial display apparatus according to claim 3, wherein an angle formed by a principal surface of the mirror device and the display surface of the display unit is 45 degrees.

13. The aerial display apparatus according to claim 5, wherein an angle formed by a principal surface of the mirror device and the display surface of the display unit is 45 degrees.

* * * * *